United States Patent [19]

Liautaud et al.

[11] Patent Number: 5,684,488
[45] Date of Patent: Nov. 4, 1997

[54] REARVIEW MIRROR MOUNTED DETECTION SIGNAL SENSOR SYSTEM

[75] Inventors: James P. Liautaud, Chicago; Michael D. Boyer, Elgin, both of Ill.

[73] Assignee: Gabriel, Inc., Elgin, Ill.

[21] Appl. No.: 596,668

[22] Filed: Feb. 5, 1996

[51] Int. Cl.$^6$ ........................................ G01S 7/40
[52] U.S. Cl. ........................................ 342/20
[58] Field of Search ........................ 342/20; 455/227, 455/345, 353; 359/872, 636; D10/106; D14/85; 340/468, 479

[56] References Cited

U.S. PATENT DOCUMENTS

| | | | |
|---|---|---|---|
| 4,625,210 | 11/1986 | Sagl | 342/20 |
| 4,630,904 | 12/1986 | Pastore | 340/98 |
| 4,633,521 | 12/1986 | Liautaud | 455/345 |
| 4,801,938 | 1/1989 | Holmes | 342/20 |
| 4,893,112 | 1/1990 | Hatcher | 340/479 |
| 5,001,777 | 3/1991 | Liautaud | 455/227 |

*Primary Examiner*—Daniel T. Pihulic
*Attorney, Agent, or Firm*—Trexler, Bushnell, Giangiorgi & Blackstone, Ltd.

[57] ABSTRACT

A speed detection signal sensor system for use with a vehicle. The system includes a signal sensing device positioned in a housing assembly. The housing assembly includes a reflective portion such as a mirror. The sensing device is positioned between the reflective portion and the housing. A sensor is positioned relative to the housing assembly and the reflective portion for sensing a speed detection signal which is directed towards the vehicle either from a forward position or a rearward position relative to the vehicle. A signal sensing indicator may be positioned relative to the housing assembly and generally in the reflective portion. Alternatively, the signal sensing indicator may be positioned externally of the housing assembly for attachment in a convenient location. The signal sensing indicator provides indicia that a speed detecting signal has been sensed by the detecting device.

10 Claims, 5 Drawing Sheets

REARVIEW MIRROR MOUNTED DETECTION SIGNAL SENSOR SYSTEM

BACKGROUND

The present invention pertains to a radar and/or laser vehicle speed detecting signal sensor system. More particularly, the present invention pertains to a detection signal sensor system which includes speed detecting signal sensing circuitry retained in an external assembly.

A variety of speed detecting signal sensor systems are available such as are manufactured for use in automobiles and other vehicles. Such sensing systems are generally well known in the art. Typically such a speed detection signal sensor system includes a housing and a circuit board which is positioned and retained in the housing to receive a signal, process the signal and provide an output, a control and indicia panel and device which indicates whether or not a speed detecting device is monitoring the actions of the vehicle. The housing assembly is often designed for internal use in the vehicle passenger compartment. The speed detecting signal sensing system then senses the signals through the window of the vehicle and may provide an auditory as well as visual feedback pertaining to the sensed detecting signal.

One problem which arises with such an assembly is how to position it so that it can sense both speed detecting signals from a rearward direction as well as a forward direction. Prior art devices have overcome this problem for use in automobiles by providing a rearwardly facing and a forwardly facing sensor. In such a configuration, the system is positioned centrally in the vehicle passenger compartment with the forward sensor directed toward the front windshield and the rearward sensor directed toward the rear windshield. This is a problem, however, when the sensors are obstructed. For example, if a passenger is sitting centrally in the vehicle and is blocking the path between the rear window and the rear-directed sensor, the signal from a rearwardly directed speed detecting device may not be received by the rearwardly facing sensor. As such, the device may not provide effective monitoring of a rear detecting signal.

One way in which the prior art has resolved this problem is by placing sensors in the front and the rear of the vehicle. These sensors are typically positioned on the outside of the vehicle so as to avoid any obstruction which may occur inside the passenger compartment. One problem that arises with this type of mounting is that these sensor assemblies are exposed to the elements as well as possibly being visually exposed. The visual exposure could result in the theft of the sensing device. With regard to exposure to the elements, weather proofing structures have been provided in an attempt to prevent these devices from being damaged by environmental conditions.

The aforementioned problems are exacerbated when such a speed detecting signal sensor system is used with motorcycles or other vehicles which do not include an enclosed passenger compartment or a convenient location to externally mount such devices. A device which is designed for use inside an automobile passenger compartment may encounter practical limitations when used with a motorcycle. For example, these devices are typically not designed for exposure to the elements and therefore the operator must take precautions in order to prevent exposure of the device to moisture. Further, a device which is designed for use in the an internal passenger compartment may be subject to theft because it may be difficult to permanently attach it to the motorcycle.

Another problem which arises is the need to sense both forward and rearward speed detecting signals. Due to the alignment of one or more passengers on a motorcycle, it is not practical to have one device which senses both forward and rearward detecting signals. To use such a device on a motorcycle is impractical because the passengers likely will obstruct the rearward directed sensor. Devices such as mentioned above which include two sensors, one sensor mounted in the front and one sensor mounted in the rear of the vehicle, may find application in motorcycle use but may be aesthetically undesirable. Such devices would likely appear rather prominently on a motorcycle due to the smaller size of the overall structure of the motorcycle compared to an automobile and the need to position such structure in a unobstructed position in order to sense the speed detecting signals.

As an additional consideration, the control panel or area of a motorcycle is substantially smaller than the dashboard or control area in an automobile compartment. As such, there is a premium placed on the space used for locating essential controls and indicators which must be observed and used by a motorcycle operator. The use of speed detecting signal sensor systems should not obstruct of the use of such essential controls and indicators. However, prior art devices include a control and indicia panel either as a integral component of the assembly or as a separate component of the assembly.

OBJECTS AND SUMMARY

A general object satisfied by the claimed invention is to provide a speed detection signal sensor system which is protected from environmental conditions and generally concealed to prevent theft.

Another object satisfied by the claimed invention is to provide a speed detection signal sensor system which is generally positioned outwardly of a vehicle to sense both a front and rear speed sensing signal.

A further object satisfied by the claimed invention is to provide a speed detection signal sensor system which has minimal impact on aesthetics of a vehicle.

Yet another object satisfied by the claimed invention is to provide a speed detection signal sensor system which is integrated in and includes a mirror assembly.

Briefly, and in accordance with the foregoing, the present invention envisions a speed detection signal sensor system for use with a vehicle. The system includes a signal sensing device positioned in a housing assembly. The housing assembly includes a reflective portion such as a mirror. The sensing device is positioned between the reflective portion and the housing. A sensor is positioned relative to the housing assembly and the reflective portion sensing a speed detection for detecting a sensing signal which is directed towards the vehicle either from a forward position or a rearward position relative to the vehicle. A signal sensing indicator may be positioned relative to the housing assembly and generally in the reflective portion. Alternatively, the signal sensing indicator may be positioned externally of the housing assembly for attachment in a convenient location. The signal sensing indicator provides indicia that a speed detecting signal has been sensed by the detecting device.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
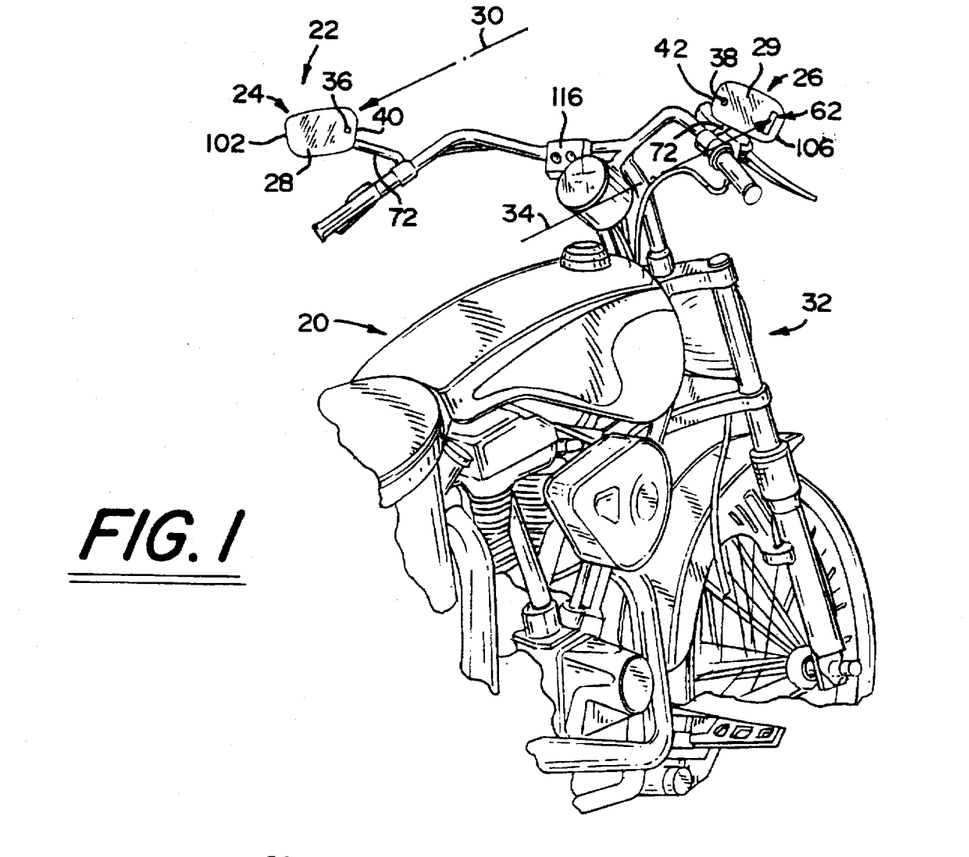
FIG. 1 is a partial fragmentary, perspective view of a portion of a motorcycle including a sensor system of the claimed invention for sensing a speed detection signal showing the sensor system having a pair of outboard mirror assemblies housing a sensing device for detecting and sensing a detection signal directed from a forward position relative to the motorcycle and a rearward position relative to the motorcycle.
Figure 2:
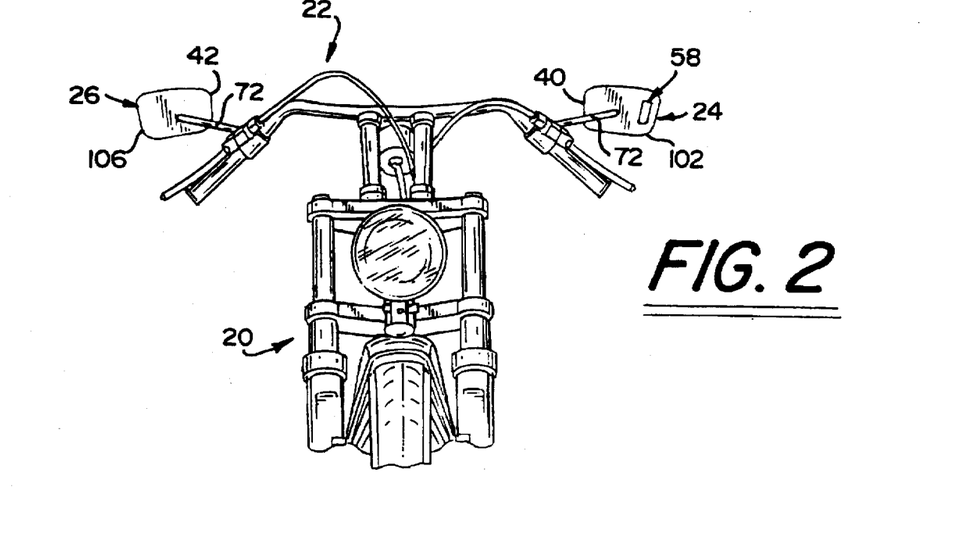
FIG. 2 is a partial fragmentary, front, elevational view of the motorcycle as shown in FIG. 1.

With reference to FIG. 1, a motorcycle 20 is shown from a perspective view having a detection signal sensor system or sensor system 22 of the present invention. With further reference to FIG. 2, the sensor system 22 includes a left outboard mirror assembly 24 and a right outboard mirror assembly 26. The mirror assemblies 24, 26 are positioned on a handle bar assembly 27 towards the front of the motorcycle 20 generally, as with most motorcycle mirrors, positioning a reflective body or surface 28, 29, respectively, thereof forwardly of the rider's position.

Reference will be made herein to "detection signals". This term is intended to include, but not be limited to, radar signals and laser signals. Such signals are often employed to detect the speed of a vehicle. For a variety of legitimate legal purposes it is important to many drivers to detect such signals while operating their vehicle.

As shown herein and described in detail below, the left mirror assembly 24 is configured and oriented to receive a detection signal 30 from a front position 32 of the motorcycle 20. The right minor assembly 26 is configured and oriented to receive a detection signal 34 from behind the motorcycle 20. The mirror assemblies 24, 26 are positioned outboardly of the motorcycle 20 and provide indicators 36, 38 which are positioned on the inboard edge 40, 42 of the respective mirror assemblies 24, 26. Positioning the mirror assemblies 24, 26 outboardly away from the motorcycle places the sensing detector assembly 24 in a desirable position for detecting signals 30, 34. Positioning the indicators 36, 38 inboardly places these indicators 36, 38, and the information which they represent, within the rider's natural field of vision thereby improving the response time once an indicator is activated. Alternatively, the signal sensing indicators 36,38 may be provided as separate components and positioned externally of the mirror assemblies 24,26 for attachment to a convenient location on the handle bar assembly 27. For example, the indicators might be located on a control panel 43 mounted to the handle bar assembly 27.

It should be noted that the orientation of the mirror assemblies 24,26 could be switched such that the left mirror assembly 24 could sense a rearward signal 34 and the right mirror assembly 26 could receive a forward signal 30. More important than the choice of which side the from and rear sensing assembly should be positioned is the result that a motorcycle or other vehicle may now monitor for detection signals forwardly and rearwardly of the vehicle without obstructing the sensing assemblies.

As will be described in greater detain hereinbelow, the sensing detector system 22 of the present invention includes a detection signal receiving assembly 44 which is retained in both the mirror assemblies 24, 26. The signal receiving assembly 44 is generally of a known construction for sensing radar signals, microwave signals and laser signals. The signal receiving assembly 44 includes circuitry which receives and processes a detection signal and controls the indicators 36, 38 in response to such detection signals. Other forms of the indicators 36, 38 as shown herein are single illuminated devices such as LEDs. Other forms of the indicators 36, 38 may be provided such as multiple illuminated devices which provide information about the signal type or strength as well as the presence of a signal.

Figures 11, 12:
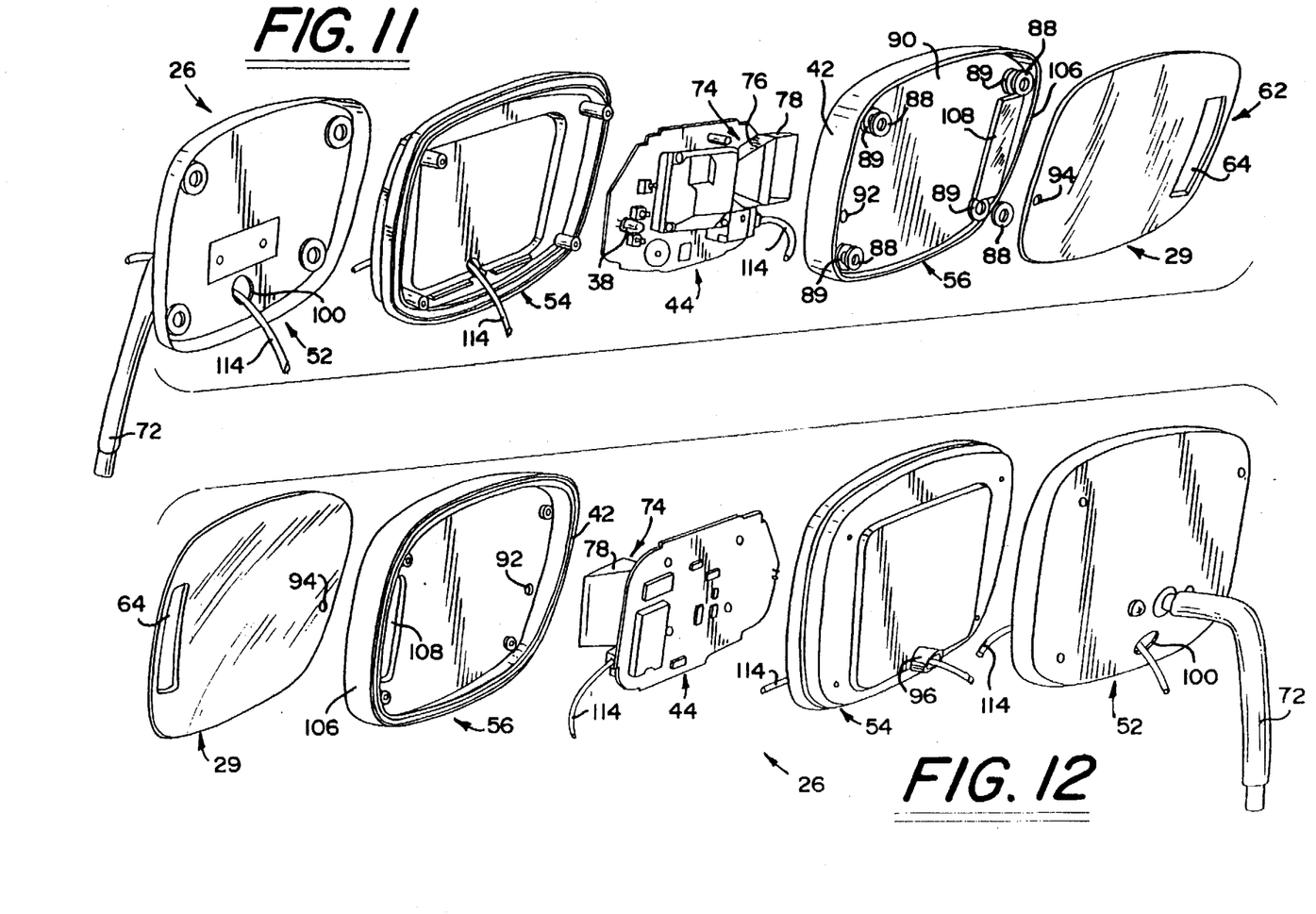
FIG. 11 is an exploded, perspective view of the right mirror assembly in which the components of the mirror assembly have been exploded forwardly away from a rear housing structure to show the front of the components.
FIG. 12 is an exploded perspective view of the component of the right mirror assembly as shown in FIG. 11 in which the components have been exploded rearwardly away from the rear housing to show the a back of the components.

With further reference to the exploded perspective views as shown in FIGS. 6, 7, 11 and 12, the left mirror assembly 24 includes a rear housing portion 46, an intermediate housing portion 48, a front housing portion 50 and the reflective body 28. Similarly, the right mirror assembly 26 includes a rear housing portion 52, an intermediate housing portion 54, a front housing portion 56 and a reflective body 29. As can be seen from FIGS. 6 and 7, the left side mirror assembly 24 includes a transmissible area 58 which has an aperture 60 formed through the rear housing portion 46. As shown in FIGS. 11 and 12 the right mirror assembly 26 includes a transmissible area 62 having a portion of the reflective surface of the reflective body 29 removed defining a revealed area 64. In both the left and right mirror assemblies 24, 26, the signal receiving assembly 44 is retained between the respective rear housing portions 46, 52, intermediate housing portions 48, 54, and front housing portions 50, 56. In fact, it should be noted that the detecting devices 44, 45 are essentially identical except for orientation.

Figures 3, 4, 5:
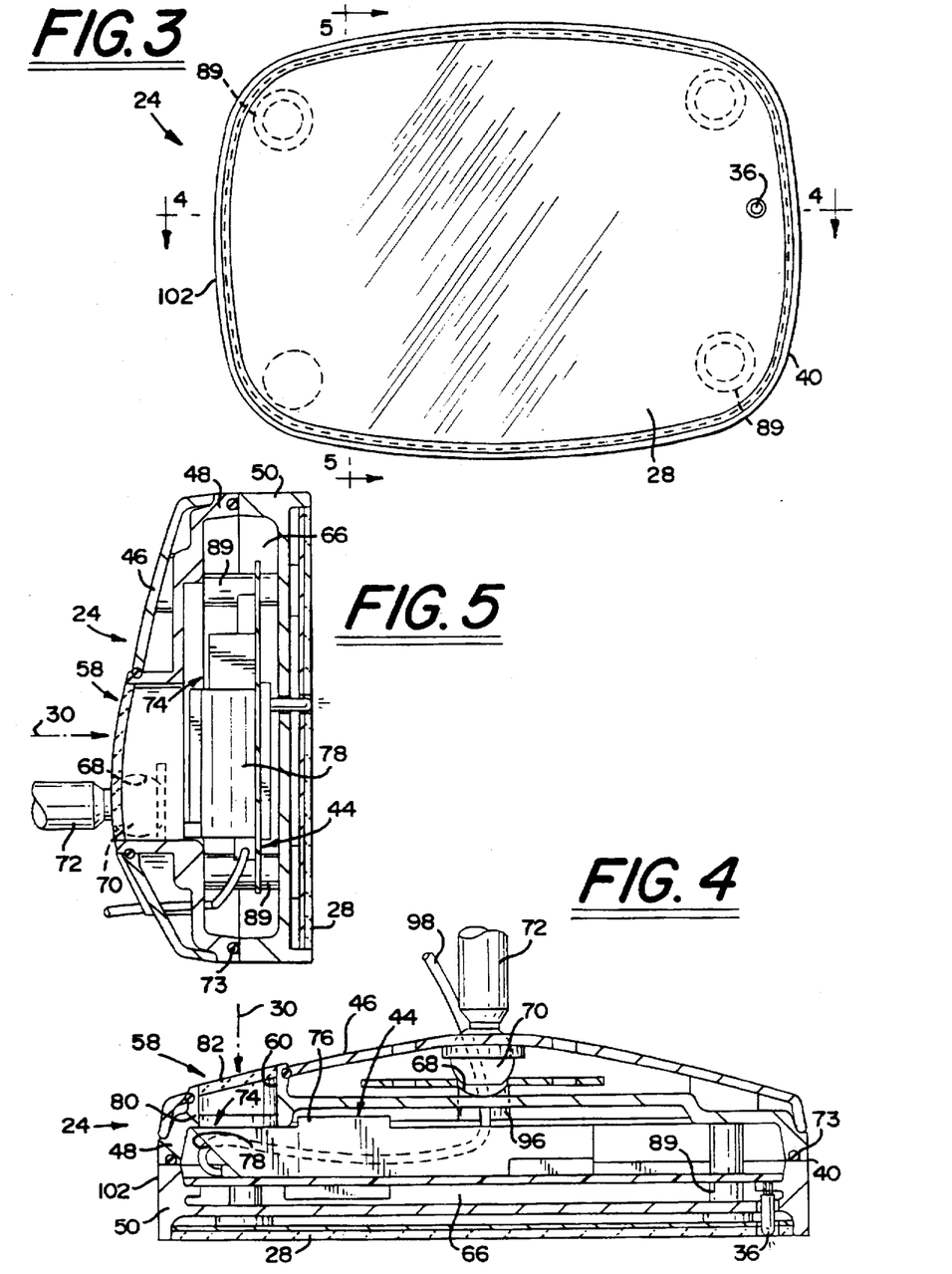
FIG. 3 is a front, elevational view of the left side mirror assembly (relative to the driver's position) showing a reflective portion of the mirror assembly.
FIG. 4 is a partial fragmentary, cross-sectional, top plan view of the left mirror assembly taken along line 4—4 in FIG. 3.
FIG. 5 is a partial fragmentary, cross-sectional, side elevational view of the left mirror assembly taken along 5—5 in FIG. 4.

Turning now to FIGS. 3–7, the structure and function of the left mirror assembly 24 will be described in greater detail. FIG. 3 provides a front, elevational view of the reflective body. As shown in the cross sectional views of FIGS. 4 and 5, when the front housing 50 and intermediate housing 48 are assembled, a cavity 66 is defined therein for housing the signal receiving assembly 44. The rear housing portion 46 includes a socket 68 for receiving a ball head 70 of an attachment arm 72. A gasket 74 is retained between the intermediate housing portion 48 and the front housing portion 50 to provide a sealed environment in the chamber 66. As such, the detecting device 44 is protected from adverse environmental effects.

Figure 6:
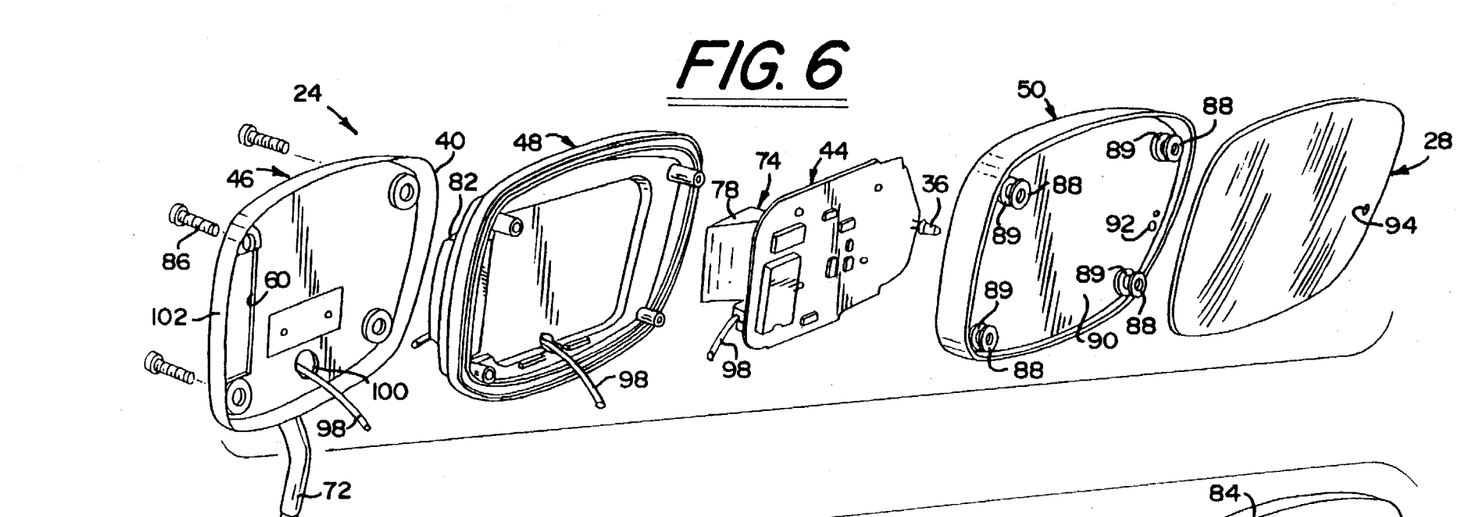
FIG. 6 is an exploded, perspective view of the left mirror assembly in which the components of the mirror assembly have been exploded forwardly away from a rear housing structure to show the front of the components.
Figure 7:
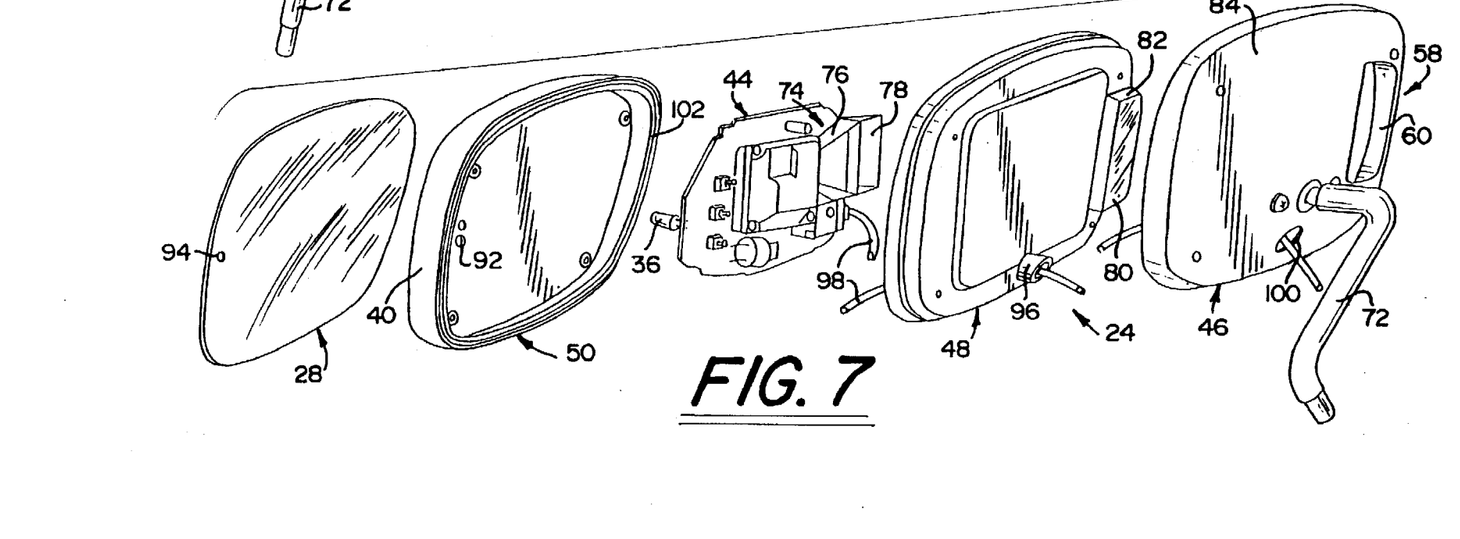
FIG. 7 is an exploded perspective view of the component of the left mirror assembly similar to that as shown in FIG. 6 in which the components have been exploded rearwardly away from the rear housing to show the back of the components.
Figures 8, 9, 10:
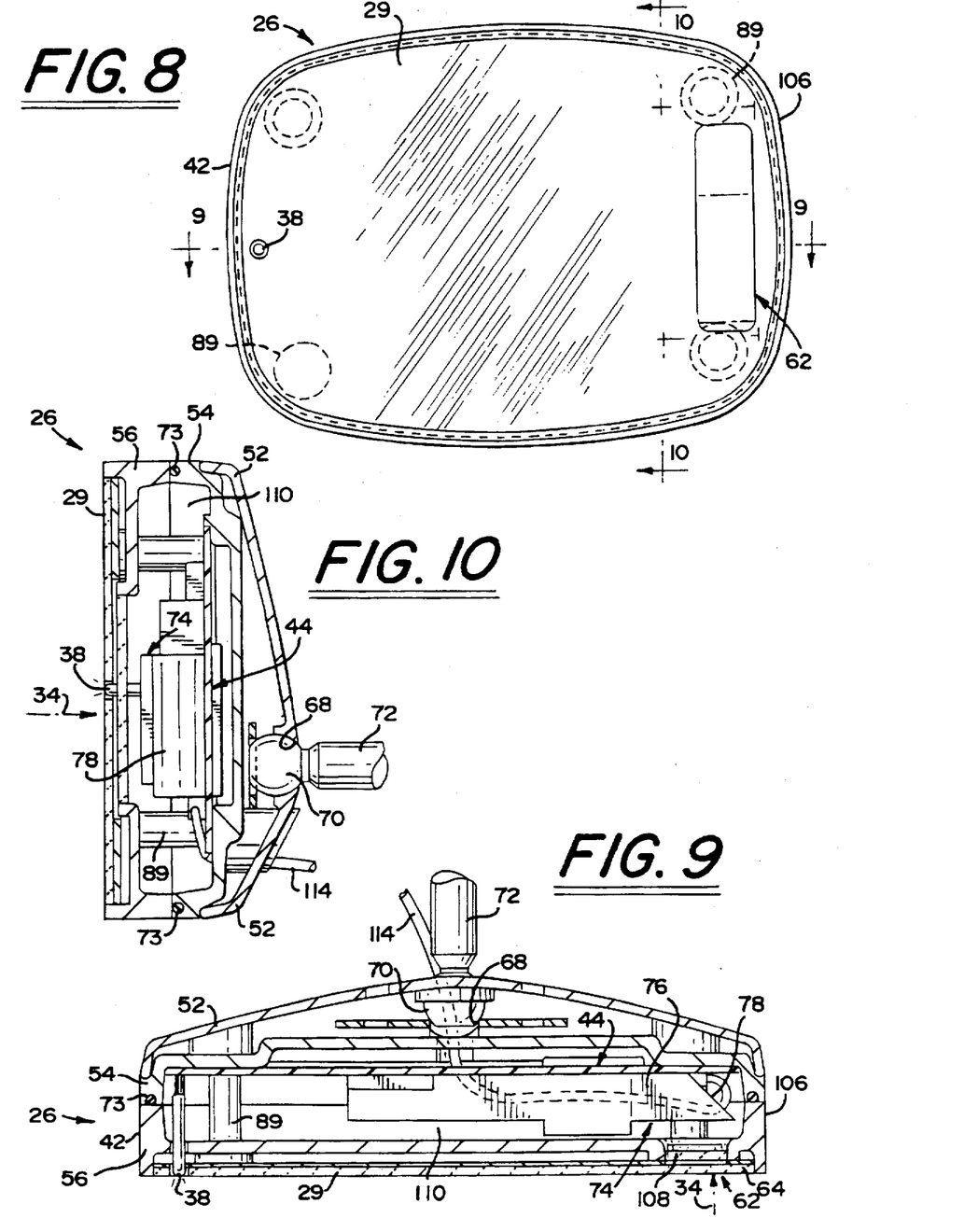
FIG. 8 is a from, elevational view of the right side mirror assembly (relative to the driver's position) showing a reflective portion of the mirror assembly.
FIG. 9 is a partial fragmentary, cross-sectional, top plan view of the left mirror assembly taken along line 9—9 in FIG. 8.
FIG. 10 is a partial fragmentary, cross-sectional, side elevational view of the left mirror assembly taken along line 10—10 in FIG. 8.

With further reference to FIGS. 6 and 7, the signal receiving assembly 44 includes a circuit board 74 having components thereon including a sensor 76 and an angular deflector 78. The angular deflector 78 is positioned behind a transmissible cover 80 formed in the intermediate housing portion 48. The transmissible cover 80 allows the signal receiving assembly 44 to be positioned rearwardly towards the rear housing portion 46 thereby positioning the angular deflector 78 as close as possible to the aperture 60. This positioning of the signal receiving assembly 44, and more specifically the sensor 76 helps to assure that the maximum signal reception will be achieved by the signal receiving assembly 44. The structure of the transmissible cover 80 is designed to extend into the aperture 60 so that a surface 82 of the transmissible cover is generally continuous with an outside surface 84 of the rear housing portion 46.

Fasteners 86 extend through the mirror assembly 24 to hold the rear housing portion 46, intermediate housing portion 48 and front housing portion 50 in assembly. An adhesive material 88 is applied to the bosses 89 on a front side 90 of the front housing portion 50 to retain the mirror portion 28 thereon. A small bore 92 is formed through the front housing 50 to receive the indicator 36 attached to the circuitry board 74 therethrough. A corresponding portion 94 of the mirror 28 does not have the reflective material thereon in order to allow the indicator 36 to be visible therethrough. A port 96 is provided through the intermediate housing portion 48 to allow power connections 98 to extend therethrough and through a corresponding opening 100 in the rear housing portion Once assembled, it can be seen that the left mirror assembly 24 is positioned on the left hand side of the motorcycle rider. This position facilitates reception of a signal through an outboard side 102 of the mirror assembly 24 spaced away the rider and to provide an indicator 36 along an inboard side 40 to place the indicator in the rider's field of view. The detecting device 44 is completely contained and environmentally sealed in the cavity 66 between the front housing portion 50 and the intermediate housing portion 48.

Turning now to the structures of the right mirror assembly 26 as shown in FIGS. 8–12, it can be seen that the structures are similar in many respects to the left mirror assembly 24 as described hereinabove. However, it must be remembered that the right mirror assembly 26 is configured to receive a detection signal 34 from behind the motorcycle rider. The signal receiving assembly 44 has been configured with the sensor 76 and angular deflector 78 oriented for receiving the signal 34 from the rear. Further, the detecting device 45 has been positioned with the angular deflector 78 positioned along an outboard side 106 of the right mirror assembly 26.

A transmissible cover 108 is provided in the front housing portion 56 with the detecting device 45 being retained in a cavity 110 between the front housing portion 56 and the intermediate housing portion 54 proximate to the transmissible cover 108. As noted hereinabove, the transmissible area 62 also includes the revealed area 64 which is proximate to the transmissible cover 108. In this regard, there is no reflective material of the mirror 29 in the revealed area 64 to reflect or otherwise reduce or prevent signal 44 reception. The indicator 38 is positioned on the same side of the detecting device 44 as the signal receiving assembly 74 in order to provide an indicator signal in the same manner as the left mirror assembly 24 discussed hereinabove. Further, the front housing includes a bore 92 positioned near the inboard side 42 with a revealed area 94 also being formed proximate thereto. The revealed area 94, bore 92 and indicator 38 provide the motorcycle rider with indication of a detection signal. In the same manner as described hereinabove with regard to the left mirror assembly 24, the right mirror assembly 26 also includes the gasket 73 positioned between the front housing portion 56 and the intermediate housing portion 54 to provide the sealed chamber 110 therebetween.

The present invention provides many benefits such that the detection signal sensor assembly 22 is capable of sensing a detection signal coming from the front 30 of the motorcycle 20 or from the rear 34 of the motorcycle 20. The mirror assemblies 24, 26 retain the signal sensing assembly 44 therein and provide protection from detrimental environmental effects as well as theft because the assembly is concealed within the mirror housing. Additionally, except for actually removing the mirrors, which can be quite difficult on most motorcycles, the signal sensing assemblies 44 are essentially theft-proof. Further, the present configuration positions the assemblies 44 in a convenient location to provide unobstructed sensing fields forwardly and rearwardly as well as positioning indicators 36, 38 within the operator's visual field while operating the motorcycle, either in the reflective area of the mirror or located externally of the minor assemblies 24,26 as discussed above.

The present invention may be configured with only a forward facing mirror assembly 24 if a rearwardly facing mirror assembly 26 is not necessary. In this regard, should the owner of motorcycle not desire the additional rearwardly directed signal sensing assembly 44 or does not wish to pay for the additional assembly, the forward facing assembly may be installed independently of the rearwardly facing assembly.

Further, the leads 98, 114 attached to the signal sensing assemblies 44 are easily routed along or through the attachment arms 72 and directly connected to the ignition of the motorcycle. Such wiring will assure that the detection signal sensor system 22 will be active while the motorcycle 20 is operating. This is a convenient way to operate the system to assure maximum sensing protection. Many speed detecting devices installed in patrol vehicles for detecting the speed of vehicles are continuously operated. Therefore, while the operator of the patrol vehicle may not be checking for speed, the constant operation of the detector signal sensing system 22 of the present invention will indicate to the operator of the motorcycle the presence of such a patrol vehicle.

While the operator of the motorcycle or other vehicle using the present system 22 may not be speeding and therefore may not be subject to a speeding violation, knowing the presence of a patrol vehicle may be of importance. This may be particularly true since knowing the presence of a patrol vehicle while operating a high performance vehicle will place the operator of the high performance vehicle on a higher alert. Thus, while the operator of the high performance vehicle may be within all legal limits and obeying all traffic signs and procedures, the operator of the high performance vehicle will be on a higher level of alertness in order to make sure no procedure is accidentally or mistakenly violated. This warning is important for operators of high performance vehicles as well as other vehicle operators because there may be circumstances, even though the operator is within all legal limits, which may alert the operator of a patrol vehicle to stop the operator of the high performance vehicle.

Finally, it should be noted that the control panel 43 may also be coupled to the speed sensing detector system 22 of the present invention in order to provide a sensitivity control. This is important because the level of sensitivity of the signal sensing assemblies 44 may need to be controlled under different circumstances. For instance, when travelling on open highways there are relatively few interference signals or extraneous signals which would activate the signal sensing assemblies 44. On the other hand, when travelling in urban settings, other devices such as motion detectors, intrusion detectors, as well as other radar, microwave and laser sources could affect the signal sensing assemblies 44. As such, this sensitivity should be heightened under the appropriate condition. The control panel 43 is of a known construction and electrically connected to the signal sensing assemblies 44. Additionally, the control panel 43 may also include a manual on/off switch in order to deactivate the system.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. A detection signal sensor system for use with a vehicle, said system comprising:
   a housing assembly configured for outboard attachment to a vehicle;
   a reflective body attached to said housing assembly;
   a signal receiving assembly positioned between said housing and said reflective body;
   a sensor of said signal receiving assembly for sensing a signal directed toward said sensor;
   a transmissible portion of said housing assembly positioned relative to at least a portion of said signal receiving assembly, said transmissible portion including an aperture in a rear housing portion, said aperture being positioned relative to at least a portion of said sensor of said signal receiving assembly, said aperture being positioned relative to said signal receiving assembly for promoting transmission of a detection signal through said housing assembly for reception by said sensor, and
   an indicator coupled to said receiving assembly for indicating the presence of a detection signal received by said sensor, said indicator being positioned relative to said reflective body for observing said indicator while viewing said reflective body.

2. A detection signal sensor system as recited in claim 1, said housing assembly further comprising:
   a transmissible cover sized and dimensioned for covering said aperture, said transmissible cover being formed of a material through which a detection signal may pass for receipt by said sensor of said signal receiving assembly, said transmissible cover covering said aperture to protect said signal receiving assembly against adverse environmental effects.

3. A detection signal sensor system for use with a vehicle, said system further comprising:
   a housing assembly configured for outboard attachment to a vehicle;
   a reflective body attached to said housing assembly;
   a signal receiving assembly positioned between said housing and said reflective body;
   a sensor of said signal receiving assembly for sensing a signal directed toward said sensor;
   a transmissible portion of said reflective body positioned relative to at least a portion of said signal receiving assembly, for promoting transmission of a detection signal through said reflective body for detection by said sensor;
   said transmissible portion includes a revealed portion of said reflective body which is generally non-reflective, said revealed portion being positioned relative to at least a portion of said sensor of said signal receiving assembly, said revealed portion being positioned relative to said sensor of said signal receiving assembly for allowing a detection signal to pass through said revealed portion to said sensor of said signal receiving assembly; and
   an indicator coupled to said receiving assembly for indicating the presence of a detection signal received by said sensor, said indicator being positioned relative to said reflective body for observing said indicator while viewing said reflective body.

4. A detection signal sensing system for use with a vehicle, said sensing system comprising:
   a pair of housing assemblies configured for being positioned on a vehicle extending outboardly, generally from opposite sides thereof;
   each of said housing assemblies including at least a rear housing portion and a reflective body attached thereto;
   a signal receiving assembly positioned between each of said reflective body and corresponding said rear housing portion so as to contain a detecting device therein;
   each of said signal receiving assemblies including a sensor coupled thereto;
   one of said signal receiving assemblies sensing a signal directed toward said vehicle from a forward position and the other of said assemblies sensing a signal directed toward said vehicle from a rearward position; and
   each of said signal receiving assemblies including an indicator coupled thereto for indicating the presence of a signal.

5. A detection signal sensor system as recited in claim 4, said signal receiving assembly further comprising:
   said indicator being positioned relative to said reflective body for observing said indicator while viewing said reflective body.

6. A detection signal sensing system as recited in claim 4, further comprising:
   a first housing assembly of said pair of housing assemblies having a transmissible portion positioned thereon relative to at least a portion of said signal receiving assembly for promoting transmission of a detection signal through said first housing assembly to said signal receiving assembly; and
   a second housing assembly of said pair of housing assemblies having a transmissible portion positioned on said reflective body relative to at least a portion of said signal receiving assembly for promoting transmission of a detection signal through said reflective body to said signal receiving assembly.

7. A detection signal sensing system as recited in claim 6, said transmissible area in said first housing assembly further comprising:

an aperture in said rear housing portion of said first housing assembly, said aperture being positioned relative to said signal receiving assembly for allowing a detection signal to pass through said rear housing portion to said signal receiving assembly.

8. A detection signal sensing system as recited in claim 6, said first housing assembly further comprising:

an aperture in said rear housing portion positioned relative to said signal receiving assembly for promoting transmission of a signal through said rear housing portion; and a transmissible cover sized and dimensioned for covering said aperture, said transmissible cover being formed of a material through which a detection signal passes for receipt by said signal receiving assembly, said transmissible cover covering said aperture for protecting said signal receiving assembly against adverse environmental effects.

9. A detection signal sensing system as recited in claim 6, said transmissible area of said second housing assembly further comprising:

a revealed portion of said reflective body which is generally non-reflective, said revealed portion being positioned relative to at least a portion of said signal receiving assembly for allowing a detection signal to pass through said revealed portion to said signal receiving assembly.

10. A detection signal sensing system as recited in claim 4, further comprising said housing assembly being sealed to protect said signal receiving assembly retained therein from adverse environmental conditions.

* * * * *

UNITED STATES PATENT AND TRADEMARK OFFICE
CERTIFICATE OF CORRECTION

PATENT NO. : 5,684,488
DATED : November 4, 1997
INVENTOR(S) : James P. Liautaud and Michael D. Boyer It is certified that error appears in the above-indentified patent and that said Letters Patent is hereby corrected as shown below:

Column 3, Line 4 "minor" should be -- mirror --
Column 3, Line 11 "minor" should be -- mirror --
Column 3, Line 13 "minor" should be -- mirror --
Column 3, Line 20 "minor" should be -- mirror --

Column 4, Line 8 "minor" should be -- mirror --
Column 4, Line 30 "from" should be --front --
Column 5, Line 3 "from" should be --front --
Column 5, Line 5 "from" should be --front --
Column 5, Line 33 "from" should be --front --
Column 5, Line 34 "from" should be --front --
Column 5, Line 43 "portion" should be -- portion 46. --
Column 6, Line 37 "minor" should be -- mirror --

Signed and Sealed this

Second Day of June, 1998

Attest:

BRUCE LEHMAN

Attesting Officer

Commissioner of Patents and Trademarks